Jan. 6, 1970    T. H. SHEPHERD ET AL    3,488,215
NONFOGGING TRANSPARENT MATERIAL
Filed June 21, 1968
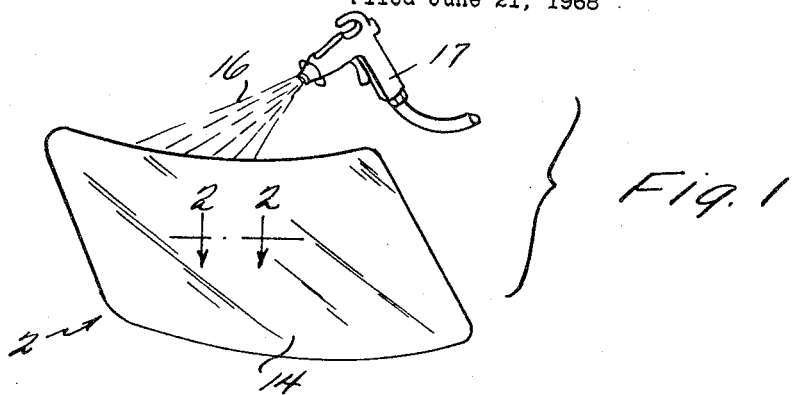
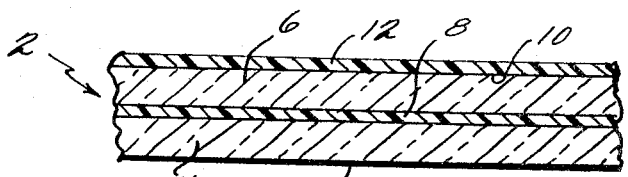
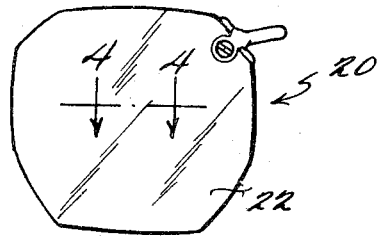
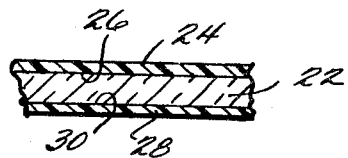
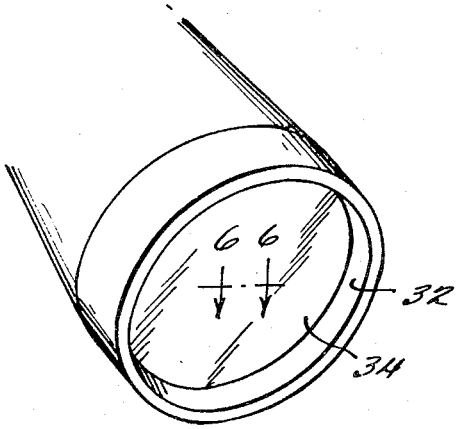
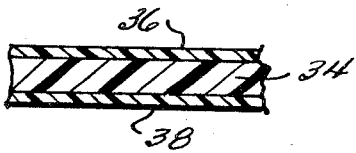
INVENTORS
THOMAS H. SHEPHERD
FRANCIS E. GOULD
BY
*Cushman, Darby & Cushman*
ATTORNEYS

United States Patent Office 3,488,215
Patented Jan. 6, 1970

3,488,215
NONFOGGING TRANSPARENT MATERIAL
Thomas H. Shepherd, Hopewell, and Francis E. Gould, Princeton, N.J., assignors to National Patent Development Corporation, New York, N.Y., a corporation of Delaware
Continuation-in-part of applications Ser. No. 567,856, July 26, 1966, and Ser. No. 654,044, July 5, 1967. This application June 21, 1968, Ser. No. 738,887
Int. Cl. C03c 17/00, 17/12
U.S. Cl. 117—124    22 Claims

ABSTRACT OF THE DISCLOSURE

A transparent nonfogging coating is applied to a normally fogging transparent or reflecting substrate. The nonfogging coating preferably comprises a hydrophilic acrylate or methacrylate polymer. The polymer can be modified by copolymerization with a monobasic or polybasic unsaturated carboxylic acid or partial ester thereof. The polymer can be crosslinked with a polyepoxide to increase its hardness.

Typical substrates include automobile, train and aeroplane windows, sunglasses, camera lens, microscope lens, binocular, telescope lens, meat wrappers, diving masks, ski glasses, mirrors.

---

The present application is a continuation-in-part of application Ser. No. 654,044, filed July 5, 1967 and application Ser. No. 567,856, filed July 26, 1966.

The present invention relates to a nonfogging coating for transparent or reflecting substrates normally subject to fogging.

The problem of fogging of automobile, train and aeroplane windows as well as lens such as eyeglasses, binoculars, camera lenses, mirror and other transparent or reflecting surfaces made of glass, plastic or metal is well known. At present no effective means have been developed to overcome these problems. The situation is particularly serious in connection with automobiles where the fogging of the windshield or backlight makes driving exceedingly hazardous.

Accordingly, it is an object of the present invention to develop a transparent, nonfogging coating for transparent or reflecting surfaces.

A more specific object is to prepare a transparent coating for automobile windows.

Another object is to develop a transparent, scratch, solvent and abrasion resistant coating for transparent or reflecting surfaces made of glass, plastic or metal.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing as a coating for a transparent or reflecting surface a coating of a hydrophilic polymer, preferably a hydrophilic acrylate or methacrylate. The hydrophilic acrylate or methacrylate, for example, absorbs water and makes the surface clear under conditions which normally cause fogging of the transparent surface. When large amounts of water are absorbed the polymers have a tendency to be soft and gummy. It has been found desirable for best results to copolymerize 80 to 99%, usually 85 to 98%, of the acrylate or methacrylate with 20 to 1%, usually 2 to 15%, of an ethylenically unsaturated mono or polycarboxylic acid or partial ester of an ethylenically unsaturated polycarboxylic acid.

The hydrophilic monomer is preferably a hydroxyalkyl mono acrylate or methacrylate such as 2-hydroxyethyl acrylate, 2-hydroxyethyl methacrylate, diethylene glycol monoacrylate, diethylene glycol monomethacrylate, hydroxy propyl acrylates and methacrylates, e.g. 2-hydroxypropyl acrylate, 2-hydroxypropyl methacrylate, 3-hydroxypropyl acrylate, 3-hydroxypropyl methacrylate, dipropylene glycol monomethacrylate. Acrylamide, methylol acrylamide, methacrylamide and methylol methacrylamide and methylol methacrylamide also are useful a hydrophilic monomers as is diacetone acrylamide.

In preparing hydroxyalkyl monoacrylates and methacrylates a small amount of the diacrylate or dimethacrylate is also formed. This need not be removed and in fact its presence is frequently helpful in forming, hard, abrasion, scratch and solvent resistant coatings. Usually not over 2% of such monomer, e.g. ethylene glycol dimethacrylate, ethylene glycol diacrylate, diethylene glycol dimethacryate or the like, is employed.

As the ethylenically unsaturated acid there can be used acrylic acid, cinnamic acid, crotonic acid, metthacrylic acid, itaconic acid, aconitic acid, maleic acid, fumaric acid, measconic acid and citraconic acid. Also, there can be used partial esters such as mono 2-hydroxypropyl itaconate, mono 2-hydroxyethyl itaconate, mono 2-hydroxyethyl citraconate, mono 2-hydroxypropyl aconitate, mono 2-hydroxyethyl maleate, mono 2-hydroxypropyl fumarate, mono methyl itaconate, monoethyl itaconate, mono methyl Cellosolve ester of itaconic acid (methyl Cellosolve is the monomethyl ether of diethylene glycol), mono methyl Cellosolve ester of maleic acid.

The hydrophilic polymers and especially the copolymers used in the present invention impart transparent, scratch, solvent and abrasion resistant, nonfogging coatings to glass, metal and plastic transparent reflecting surfaces.

A fogging effect usually results from the condensation of a portion of the moisture content of warm air on a cool surface.

The transparent reflecting surfaces which can be treated include glass surfaces such as automobile windows, e.g. the windshield, back light and side windows, train windows, windows in buildings, e.g. apartments, homes, stores and office buildings, glass mirrors, eyeglasses including for example conventional eyeglasses, sunglasses, diving masks and ski glasses, camera lenses, microscope lenses, telescope lenses, binoculars and opera glasses, gun sights, drinking glasses (whereby the condensation occurring when iced drinks are placed therein is eliminated), transparent plastic surfaces including aeroplane windows, car and train windows, transparent films and containers used as coverings for packaged foods, e.g. meat packaged in a tray having a transparent top film of biaxially oriented irradiated polyethylene, reflecting metal surfaces such as chrome mirrors, etc.

As used in the present specification and claims the term "automobile" is intended to cover cars, trucks, buses and all other automobile vehicles.

The transparent plastic having a fogging tendency can be polymerized methyl methacrylate, polycarbonate, e.g. 4,4'-isopropylidene diphenol polycarbonate as well as other polycarbonates as shown in Fritz Patent 3,305,520 and Christopher and Fox "Polycarbonates" (pages 161–176) (1962), diethylene glycol bis (allyl carbonate) cellulose acetate, cellulose propionate, cellulose acetatepropionate, biaxilly oriented polyethylene, biaxilly oriented irradiated polyethylene (e.g. irradiated to 2–20 megarad), biaxilly oriented polypropylene, biaxially oriented polystyrene, biaxially oriented styrene-acrylonitrile copolymer, biaxially oriented polyethylene terephthalate (Mylar), biaxially oriented vinyl chloride, biaxially oriented vinylidene chloride polymers, e.g. vinylidene chloride-vinyl chloride copolymer, vinylidene chloride-acrylonitrile copolymer, quench chilled polyethylene, quench chilled polypropylene and transparent fogging plastics made by other conventional techniques.

As stated reflecting metal surfaces can be made nonfogging as can reflecting plastic, e.g. metallized Mylar or reflecting glass, e.g. a mirror (glass having a metal backing).

Glass windows, for example, can be in the form of tempered glass, plate glass or safety glass, e.g. two layers of glass laminated together with a thin layer of polyvinyl butyral or two layers of glass bonded together with Volan (methacrylato chromic chloride).

The hydrophilic polymer nonfog coating is preferably applied to the transparent or reflecting substrate as a film of 1–3 mils thickness. Films as low as 0.25 mil can be employed but there is a greater tendency for fogging to occur. There is no maximum thickness for the nonfog coating, e.g. films of 10 mils or more can be applied, but no further advantages are obtained to justify the increased cost of the nonfog coating.

The nonfog coating can be applied to the transparent or reflecting surface by spraying from a solution or dispersion of the polymer followed by curing of the polymer which can be hastened, e.g. with heat or catalyst. The hydrophilic monomer for example can be 85% converted before being applied to the surface, e.g. glass and then cured. Advantageously a small amount, e.g. 0.1–0.2% of catalyst such as a peroxide is added to hasten the cure.

If the hydrophilic monomer containing the unsaturated carboxylic acid modifier is 100% converted to the copolymer than monomers of the hydroxyalkyl methacrylate or the like and itaconic acid or the like can be added to give a mixture containing 80% copolymer and 20% monomer for example and this mixture flowed or sprayed on the transparent surface or the transparent surface can be dipped in the mixture and the hydrophilic copolymer cured. The amount of monomers added back can be from 1 to 25%.

To the already formed polymer before applying it to glass there can be added any conventional crosslinking agent in an amount of 0.25 to 20%, preferably 0.5 to 10%, most preferably 8–11%. The crosslinking agent should be one which does not interfere with the transparency of the coating in the amounts employed.

In addition to the crosslinking agents previously mentioned there can be added for example to a partially, e.g. 85% converted hydrophilic polymer ethylene glycol dimethacrylate, ethylene glycol diacrylate, divinyl benzene, divinyl toluene, triallyl melamine, N,N'-methylene-bis-acrylamide, glycerine trimethacrylate, diallyl maleate, divinyl ether, diallyl mono ethylene glycol citrate, allyl vinyl maleate, ethylene glycol vinyl allyl citrate, diallyl itaconate, ethylene glycol diester of itaconic acid, propylene glycol dimethacrylate, propylene glycol diacrylate, divinyl sulfone, hexahydro-1,3,5-triacryltriazine, triallyl phosphite, diallyl ester of benzene phosphonic acid, polyester of maleic anhydride with triethylene glycol, diethylene glycol diacrylate, polyallyl sucrose, polyallyl glucose, e.g. diallyl sucrose and triallyl glucose, sucrose diacrylate, glucose dimethacrylate, pentaerythritol diacrylate, sorbitol dimethacrylate.

The hydrophilic nonfogging polymer can even be formed into a self-sustaining film and laminated to the glass of other surfaces. Thus an already formed film could be placed on the glass and cured under heat and pressure to adhere to the glass. Alternatively, a layer of monomer containing a small amount of crosslinking agent, e.g. ethylene glycol monomethacrylate containing 0.5% of ethylene glycol dimethacrylate or itaconic acid could be placed on the glass surface, as an adhesive, the already formed nonfogging film applied on top and then the adhesive cured to laminate the glass to the nonfogging polymer.

As indicated the polymerization of the monomer as well as the subsequent curing is hastened by heat, e.g. 40 to 90° C. Polymerization, however, can be carried out at widely varying temperatures, e.g. 20 to 150° C. or even up to 235° C.

Free radical catalysts such as t-butyl peroctoate, isopropyl percarbonate, benzoyl peroxide, methyl ethyl ketone peroxide, cumene hydroperoxide, dicumyl peroxide can be employed to hasten polymerization and/or cure. The catalysts are usually employed in an amount of 0.05 to 1.0 gram, preferably 0.1 to 0.2 gram of catalyst per 100 grams of polymerizable material. The reaction is also catalyzed by ultraviolet light, gamma and other irradiation.

Polymerization can be carried out in the presence or absence of a solvent. Typical organic solvents include lower alcohols such as methyl alcohol, ethyl alcohol, and isopropyl alcohol, glycol and glycol ethers, e.g. monomethyl ether of ethylene glycol propylene glycol, ethylene glycol, diethylene glycol, dipropylene glycol, dipropylene glycol, dimethyl formamide, tetrahydrofuran and the like.

The polymeric material, preferably prior to cure and dissolved in an organic solvent (which can be diluted with chlorinated hydrocarbon, such as dichloroethylene or carbon tetrachloride or with ketones such as methyl ethyl ketone, acetone) is applied to the surface of a transparent, nonporous substrate.

As indicated the polymeric mixture is preferably applied dissolved in solvent to a selected substrate such as glass. It can be applied by spraying, dipping, knife coating, roll coating, and brushing. The coating can then be allowed to dry by evaporation of the solvent into the atmosphere. Other methods for drying, such as infrared rays can also be used. The dry coating can then be cured at the same or more elevated temperatures, e.g. 90 to 235° C., preferably 100 to 150° C.

When a coating solution is employed the copolymer generally is between 5 and 15% by weight, preferably 8 to 11%, although this can be widely varied. All of the coating materials described herein when applied to a transparent substrate produce a hard, scratch resistant, solvent resistant and abrasion resistant surface which is nonfogging and transparent. The crosslinked coatings have the hardest and most resistant properties.

If desired, the copolymer prepared according to the invention can be mixed with a polyepoxide containing at least two vicinal epoxy groups. Illustrative examples of such a polyepoxide include cycloaliphatic diepoxide such as vinyl cyclohexene dioxide, 3,4-epoxycyclohexyl-methyl-3',4'-epoxycyclohexane carboxylate (Unox 221); 3,4 - epoxy - 6 - methyl cyclohexylmethyl-3',4'-epoxy-6-methylcyclohexane carboxylate (Unox 201; limonene dioxide, 3,4 - epoxy cyclohexyl - 2',4'-dioxy-6',7'-epoxyspiroindane; butadiene diepoxide, bisphenol A-epichlorhydrin. The ratio of polyepoxide to copolymer in the mixture can vary over a wide range. Thus 1 to 50% of the polyepoxide can be used based on the weight of the hydrophilic nonfogging polymer.

There can also be added to any of the formulations minor amounts of conventional additives such as wetting agents, flow control agents, viscosity modifiers, cure accelerators, etc. The type and amount of such materials added to the mixture will be determined by the nature of the substrate to be treated.

Unless otherwise indicated all parts and percentages are by weight.

The invention will be understood best in connection with the drawings wherein:

FIGURE 1 is a view of an automobile windshield;

FIGURE 2 is a sectional view along the line 2—2 of FIGURE 1;

FIGURE 3 is a view of an eyeglass;

FIGURE 4 is a sectional view along the line 4—4 of FIGURE 3;

FIGURE 5 is a view of a gunscope; and

FIGURE 6 is a sectional view along the line 6—6.

It will be realized in the drawings the thickness of the coating is greatly exaggerated.

Referring more specifically to FIGURE 1 of the drawings, there is provided a conventional safety glass windshield 2 comprising two pieces of glass 4 and 6 adhered together by a thin polyvinyl butyral layer 8 to make the windshield shatterproof. To the inner surface 10 of the windshield there is applied a 2 mil thick coating 12 of a cured 2-hydroxyethyl methacrylate itaconic acid copolymer (95:5). No coating was applied to the outer surface 14 of the windshield. The resulting windshield was completely resistant to fogging under normal atmospheric conditions which cause fogging of windshields. The coating was both light transmitting and optically clear.

The nonfogging coating as set forth supra was applied to the windshield surfaces as a spray 16 in ethyl alcohol from spray gun 17.

The solvent evaporated and the coating cured at about 125° C.

Both sides of the windshield can be sprayed with the coating.

As shown in FIGURES 3 and 4 eyeglasses designated generically at 20 having lens 22 were provided with a 1 mil light transmitting, optically clear coating 24 on the inner surface 26 of the lens of a hydroxyethyl acrylate-cinnamic acid-diethylene glycol diacrylate polymer (96.8:3:0.2) and a similar coating 28 was applied to the outer surface 30 of the lens to produce a nonfogging eyeglass.

As disclosed in FIGURES 5 and 6 gun sight 32 having lens 34 was provided with a cured nonfogging, light transmitting optically clear coating 36 of a copolymer of 2-hydroxypropyl methacrylate-methacrylic acid (96:4) on the inner surface of the lens and a similar coating 38 on the outer surface of the lens to produce a nonfogging gun sight. Each coating was 1.5 mils thick.

EXAMPLE 1

Into a flask equipped with an agitator and a heating mantle was charged 1000 grams of silicone oil; 100 grams of 2-hydroxyethyl methacrylate and 0.33 gram of isopropyl percarbonate. The flask was placed under a nitrogen atmosphere and the contents were rapidly agitated and heated to 100° C. After 15 minutes at 100° C., the polymer slurry obtained was filtered hot to isolate the polymer. The polymer powder was reslurried in 300 ml. of xylene, filtered and dried. A 98% yield of 2 to 5 particle size powder was obtained.

EXAMPLE 2

30 grams of poly-(2-hydroxyethyl methacrylate) prepared in accordance with Example 1 was dissolved in 70 mls. of methanol. To the solution was added 4.0 grams of peppermint oil. A glass plate for use as a vehicle windshield was coated with the methyl alcohol solution of the hydrophilic polymer. The resulting coating (0.005 inch thick, i.e. 5 mils) was light-transmitting and optically clear, adherent and did not fog upon exposure to hot moist air.

A glass plate was similarly coated for use as a window to give a nonfogging window having the light-transmitting and optically clear, adherent coating. Similar nonfogging results were obtained when a mirror was coated with the methyl alcohol solution.

EXAMPLE 3

The procedure of Example 2 was repeated but the peppermint oil was omitted. The vehicle windshield had a 5 mil, light-transmitting and optically clear coating of the hydrophilic polymer. The coated windshield did not fog upon exposure to hot moist air.

EXAMPLE 4

The procedure of Example 2 was repeated but instead of the glass plate there was coated a plastic plate of methyl methacrylate for use as an aircraft windshield. The light-transmitting optically clear adherent coating obtained did not fog upon exposure to hot moist air. Similar results were obtained when the peppermint oil was omitted from the formulation.

EXAMPLE 5

The procedure of Example 2 was followed to coat an optical element in the form of a camera lens having a reflection-reducing film of magnesium fluoride thereon to form a light-transmitting, optically clear, reflection-reducing, nonfogging optical element.

Similar results were obtained when the peppermint oil was omitted from the formulation.

EXAMPLE 6

In a 1.5 liter reaction flask equipped with a timer, electric heater and a nitrogen inlet tube was charged 800 grams of ethylene glycol monomethyl ether, 180 grams of 2-hydroxyethyl methacrylate, 20 grams of acrylic acid and 2 grams of t-butyl peroctoate. The solution was heated and stirred under a carbon dioxide atmosphere at 85° C. for 6 hours. The polymer formed was precipitated by pouring the reaction solution into 10 liters of rapidly agitated water. The precipitated polymer was isolated by filtration and dried. A yield of 185 grams was obtained.

100 grams of the polymer was dissolved in a mixture of 600 grams of ethylene glycol monomethyl ether and 300 grams of methyl ethyl ketone. To the solution was added 10 grams of a cycloaliphatic diepoxide (Unox 221) and 0.05 gram of a flow control agent (Raybo 3). The Raybo 3 is not essential but its use makes a slightly smoother coating.

The solution was then sprayed on the interior surface of an automobile windshield to provide a wet film thickness of 10 mils. After drying the windshield was placed in a circulatory air oven at 250° F. for 2 hours to cure the polymer to the hard, scratch resistant condition. The windshield was nonfogging when subjected to moisture laden air.

EXAMPLE 7

100 grams of the polymer prepared in Example 6 was dissolved in a mixture of 600 grams of ethylene glycol monomethyl ether and 300 grams of methyl ethyl ketone and the solution was then sprayed on the interior surface of a Ford automobile windshield to provide a wet film thickness of 10 mils. After drying the windshield was placed in a circulatory air oven at 250° F. for 4 hours to cure the polymer to the hard, scratch resistant condition. The windshield was nonfogging when subjected to moisture laden air.

EXAMPLE 8

Plastic eyeglass lenses produced by the polymerization of diethylene glycol bis(allyl carbonate) was coated with the coating solution of Example 6 by a dipping process. After drying, the coating was cured for 1 hour at 275° F. to produce a hard, scratch resistant, nonfogging lens.

EXAMPLE 9

The procedure of Example 8 was repeated except the Unox 221 and the Raybo 3 were omitted from the coating solution and the curing was done for 2 hours at 275° F. The lenses produced had a hard, scratch resistant nonfogging coating of the cured polymer on both sides thereof.

EXAMPLE 10

800 grams of ethylene glycol monomethyl ether, 180 grams of hydroxyethyl methacrylate, 20 grams of itaconic acid and 2 grams of t-butyl peroctoate were charged into a 1.5 liter reaction flask equipped with a stirrer, electric heating and a nitrogen inlet tube. The solution was heated and stirred under a nitrogen atmosphere at 85° C. for 6 hours. The polymer was precipitated by pouring the reactive solution into 10 liters of rapidly agitated water. The precipitated copolymer was isolated by filtration and dried. A yield of 185 gams was obtained.

100 gams of the precipitated copolymer were dissolved in a solvent mixture comprising 600 grams of ethyl alcohol and 200 grams of methyl Cellosolve. To the resulting solution there was added 10 grams of itaconic acid and 10 grams of 2-hydroxyethyl methacrylate along with 3 grams of Raybo 3 as a flow control agent and 0.5 gram of t-butyl peroctoate. 76.5 grams of ethyl alcohol was then added to dilute the mixture. The mixture was sprayed on the interior surface of an automobile windshield to a wet thickness of 10 mils. It was dried at room temperature and thereafter placed in a circulating air oven at 250° F. for 30 minutes. The resulting coating was scratch, solvent and abrasion resistant, was transparent and imparted a nonfogging character when windshield was placed in an atmosphere of high humidity.

EXAMPLE 11

The procedure of Example 10 was repeated except the Raybo 3 was omitted and both the interior and exterior surfaces of the windshield was sprayed. The resulting coatings were scratch, solvent and abrasion resistant, were transparent and imported nonfogging properties to the windshield.

EXAMPLE 12

The procedure of Example 10 was repeated except that 20 grams of cinnamic acid was employed in place of the itaconic acid in making the copolymer and 10 grams of cinnamic acid was employed in place of the itaconic acid added to the solution and no Raybo 3 was used. The inner surface of the windshield which received the coating was scratch, solvent and abrasion resistant and the windshield was nonfogging when tested in a Ford under an atmosphere of high humidity.

EXAMPLE 13

A solution was prepared from the following:

| | Parts |
|---|---|
| Copolymer of hydroxyethyl methacrylate and itaconic acid (94:6) | 15 |
| Volan (methacrylate chromic chloride) | 1 |
| Hydroxyethyl methacrylate | 1 |
| t-Butyl peroctoate | 0.01 |
| Itaconic acid monomethyl ester | 0.5 |
| Raybo 3 | 0.3 |
| Methyl Cellosolve | 25 |
| Ethanol | 56.5 |

A clear lens was dipped into the solution, removed and allowed to dry. It thereby had a 1.5-mil film of the coating deposited thereon.

The lens was placed in an air circulating oven at 250° F. for 30 minutes to cure the coating. A hard, scratch resistant green tinted coating, which had excellent adherence to the lens, was obtained.

EXAMPLE 14

The procedure of Example 13 was repeated omitting the Raybo 3. The copolymer coating obtained was then cured to produce a hard, scratch resistant green tinted coating which had excellent adherence to the lens was obtained.

We claim:

1. A normally fogging transparent or reflecting substrate having on at least one surface thereof a nonfogging, transparent, scratch resistant, solvent resistant, abrasion resistant, water insoluble hydrophilic coating comprising a polymeric compound of the group consisting of hydrophilic acrylate and methacrylate polymers wherein the hydrophilic acrylate or methacrylate is selected from the group consisting of polymers of hydroxy lower alkyl acrylates, hydroxy lower alkyl methacrylates, hydroxy lower alkoxy lower alkyl acrylates and hydroxy lower alkoxy lower alkyl methacrylates wherein the alkyl groups have 2 to 3 carbon atoms and the alkoxy groups have 2 to 3 carbon atoms.

2. A substrate according to claim 1 wherein said compound is a copolymer of said hydrophylic acrylate or methacrylate with a minor amount of an ethylenically unsaturated mono or poly carboxylic acid, or partial ester of an ethylenically unsaturated polycarboxylic acid.

3. A substrate according to claim 2 wherein said carboxylic acid compound is selected from the group consisting of acrylic acid, methacrylic acid, itaconic acid, citraconic acid, aconitic acid, crotonic acid, cinnamic acid, maleic acid, fumaric acid, mesaconic acid and partial esters of itaconic acid, mesaconic acid, citraconic acid, aconitic acid, maleic acid and fumaric acid and said carboxylic acid compound is 1 to 20% of the copolymer.

4. A substrate according to claim 1 wherein the substrate is glass.

5. A glass substrate according to claim 4 in the form of a window.

6. A glass window according to claim 5 which is an automobile window.

7. A window according to claim 6 in the form of a windshield.

8. A windshield according to claim 7 wherein the hydrophilic polymer coating is selected from the group consisting of polymers of hydroxyethyl acrylate, hydroxyethyl methacrylate, hydroxypropyl acrylate and hydroxypropyl methacrylate.

9. A windshield according to claim 8 wherein the polymer is a copolymer of said acrylate or methacrylate with a minor amount of an ethylenically unsaturated carboxylic acid having 3 to 9 carbon atoms.

10. A windshield according to claim 9 wherein the copolymer is a cured copolymer of said acrylate or methacrylate with 1 to 20% of a member of the group consisting of acrylic acid, methacrylic acid, itaconic acid and cinnamic acid.

11. A substrate according to claim 1 in the form of a mirror.

12. A substrate according to claim 1 wherein the substrate is plastic.

13. A substrate according to claim 12 wherein the substrate is a window.

14. A substrate according to claim 13 wherein the window is a windshield.

15. A substrate according to claim 1 wherein the substrate is a plastic lens.

16. A plastic lens according to claim 15, wherein the hydrophilic polymer coating is selected from the group consisting of polymers of hydroxyethyl acrylate, hydroxyethyl methacrylate, hydroxypropyl acrylate and hydroxypropyl methacrylate.

17. A substrate according to claim 1 wherein said polymer includes 0.25 to 20% of a crosslinking agent.

18. A substrate according to claim 17 wherein the nonfogging coating has a thickness of 0.25 to 10 mils.

19. A substrate according to claim 18, wherein the coating has a thickness of 1 to 3 mils and the hydrophilic polymer is selected from the group consisting of polymers of hydroxyethyl acrylate, hydroxylethyl methacrylate, hydroxypropyl acrylate and hydroxypropyl methacrylate.

20. A glass lens coated with a hydrophilic, nonfogging, transparent, scratch resistant, solvent resistant, abrasion resistant, water insoluble polymer coating selected from the group consisting of polymers of hydroxyethyl acrylate, hydroxyethyl methacrylate, hydroxypropyl acrylate and hydroxypropyl methacrylate.

21. A glass lens according to claim 20 wherein the polymer is a cured copolymer of said acrylate or methacrylate with 1 to 20% of a member of the group consisting of acrylic acid, methacrylic acid, itaconic acid and cinnamic acid.

22. A glass lens according to claim 20 in the form of ski glasses.

References Cited

UNITED STATES PATENTS

| | | | |
|---|---|---|---|
| 2,143,482 | 1/1939 | Herrmann et al. | 117—124 X |
| 2,923,653 | 8/1956 | Matlin et al. | 117—140 X |
| 3,169,079 | 2/1965 | Ferington et al. | 117—124 X |
| 3,205,077 | 9/1965 | Hammond | 117—138.8 X |
| 3,216,852 | 11/1965 | Goldberg | 117—161 X |
| 3,218,305 | 11/1965 | Krieble | 260—86.1 X |
| 3,222,210 | 12/1965 | Hammond | 117—161 X |
| 3,330,814 | 7/1967 | Vasta | 117—161 X |

FOREIGN PATENTS

| | | |
|---|---|---|
| 848,873 | 9/1960 | Great Britain. |
| 648,669 | 9/1962 | Canada. |

WILLIAM D. MARTIN, Primary Examiner

M. R. P. PERRONE, Jr., Assistant Examiner

U.S. Cl. X.R.

2—2, 14; 117—35, 138.8, 161; 260—78.5, 89.5; 350—288, 319; 351—62, 166